3,206,357
AMINOARYLTRIAZENE PESTICIDE
William N. Cannon, Greenwood, and Edward R. Lavagnino and Edwin R. Shepard, Indianapolis, Ind., assignors to Eli Lilly and Company, Indianapolis, Ind., a corporation of Indiana
No Drawing. Filed Sept. 11, 1961, Ser. No. 137,072
4 Claims. (Cl. 167—30)

This invention relates to novel pesticidal compositions and to methods for their use. More particularly, the present invention relates to formulation and use of pesticide compositions containing a completely new type of pesticidally-active compound.

It is most desirable to produce a formulation having applicability as both a broad-spectrum insecticide and a miticide. Heretofore, compounds active as insecticides have not been broadly applicable as miticides and, conversely, miticides have not exhibited broad-spectrum insecticide properties. A composition which would be concomitantly applicable to both mite and insect pests would have great commercial significance.

It is an object of this invention to provide such compositions. Because of the broad applicability of these compositions to both mites and insects, the compositions of this invention are referred to as pesticides, and the term "pesticide" or "pesticidal" as used herein includes both mites and insects.

A further object of this invention is to provide new pesticidal compositions comprising as an active ingredient a totally new class of insecticidally and miticidally active compounds. Further objects include provision of means and methods for the use of the pesticidal compositions of this invention.

According to the present invention, there are provided new pesticidal compositions comprising a 1-(aminoaryl)-triazene admixed with conditioning agents or adjuvants of the type to be described below. In addition to the above, there is provided a means of combating pests (i.e., mites and insects) which comprises treating pests, as well as the loci of pests with pesticidal compositions comprising as a principal active ingredient a 1-(aminoaryl)triazene.

The 1-(aminoaryl)triazenes which comprise the active ingredient of this invention are more fully described by the following general formula:

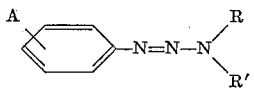

wherein A is a substituent in the ortho, meta or para position and is a lower alkylamino or preferably di-(lower)alkylamino group; R and R', when taken separately, are lower alkyl groups which can be the same or different; and, when R and R' are taken together, they comprise a heterocyclic moiety containing 3 through 7 ring atoms wherein the hetero atoms are nitrogen, oxygen, or sulfur. Representative examples include 1-(p-dimethylaminophenyl)-3,3-di-n-butyltriazine;
1-(p-dimethylaminophenyl)-3-methyl-3-benzyltriazene;
1-(3-methyl-4-dimethylaminophenyl)-3,3-dimethyltriazine;
1-(p-dimethylaminophenyl)-3,3-dimethyltriazene;
1-(2-methyl-4-dimethylaminophenyl)-3,3-dimethyltriazine; and
1-(p-diethylaminophenyl)-3,3-dimethyltriazine. It is preferred to employ a 1-(aminoaryl)triazene in which the R and R' groups, as well as the alkyl groups on the amino Group A, when taken separately, are the same and contain 1–4 carbon atoms. 1-(p-dimethylaminophenyl)-3,3-di-n-butyltriazine is an outstanding pesticidally active compound among the triazenes utilized in the pesticidal compositions of this invention.

The 1-(aminoaryl)triazenes utilized in this invention are a completely new type of pesticidally active compound in that linear triazenes have never in the past been looked to for either insecticidal or miticidal activity. It is completely unexpected and highly advantageous that the 1-(aminoaryl)triazenes, which form the pesticidally active ingredient of the pesticidal compositions of this invention, exhibit both broad-spectrum insecticidal activity as well as miticidal activity. Heretofore, miticidal compositions and insecticidal compositions have employed completely different active ingredients, insecticidal and miticidal activity requiring entrely different compounds. Therefore, the fact that the pesticidal compositions of this invention exhibit insecticidal activity coupled with miticidal activity is a significant contribution to agricultural technology.

For maximum effectiveness, the active 1-(aminoaryl)triazene ingredients of the present invention are admixed in a pesticidally effective amount with a conditioning agent of the type commonly referred to as a pest control adjuvant or modifier. In order to provide formulations particularly adapted for ready and efficient application to pests using conventional equipment, such formulations comprise those of both the liquid and solid types as well as formulations of the aerosol type. In the pure state, the active triazene ingredients may be too effective or too potent in some applications to have practical utility as pesticides. For example, for most effective protection, it is preferred to apply the active materials in intimate contact, but thoroughly dispersed on the material to be protected. Therefore, in order to benefit from the subject discovery that the defined materials are effective pesticides, there is incorporated therewith a relatively inert surface-active agent or adjuvant as a dispersing medium. Furthermore, such adjuvants have the effect of permitting the use of only minute quantities of the above-defined active ingredients in some formulation to obtain effective protection. A further advantage of so extending this material is to permit field application by methods readily employed and still obtain effectively complete coverage of the material being protected.

Thus, the formulations of this invention include a composition suitable for pesticide use upon mixture with a pesticide adjuvant, which comprises a 1-(aminoaryl)triazene. It is not intended that this invention be limited to any specific proportion of active ingredient and adjuvant. An important feature of the invention is to provide in a composition suitable for treatment of pests the improvement of employing as the active component thereof a 1-(aminoaryl)triazene.

Compositions suitable for treatment of pests generally contain an adjuvant which, upon the preparation of a formulation containing the pesticidally active triazenes of this invention in such concentration as appropriate for application, will be present to provide the proper type of contact with the material being protected. Thus, there can be employed a pesticide composition which comprises a 1-(aminoaryl)triazene and an inert pesticide adjuvant which can be a surface-active agent, such as a detergent, a soap, or other wetting agents.

Such a formulation then comprises the active ingredient in combination with a minor proportion of the surface-active agent or adjuvant. This formulation is of practical merit because of its concentrated form and ease of transportation, storage, and the like, and the formulation lends itself directly to further dilution with the carrier without resorting to complicated mixing and blending procedures. Thus, such a formulation can be further diluted with a solid carrier of the dust type by a simple mixing operation. Likewise, such a formulation can be directly suspended in water or can be further diluted with an oil which, upon mixing with water, thereby forms an oil-in-water emulsion containing the active ingredient. One further example of the utility of such a formulation comprises the preparation by further dilution with a solid carrier or a wettable powder which, upon admixture with water prior to application, forms a dispersion of the active ingredient and the solid carrier in water.

It is also intended that the term "conditioning agent" or "adjuvant" includes solid carriers of the type of pyrophyllite, kieselguhr, diatomaceous earth, and the like; and various mineral powders, such as calcium sulfate and the like, which act as a dispersant, as a carrier, and in some instances perform the function of a surface-active agent. Preferable conditioning agents are those which are either neutral or mildly alkaline, since acidic agents, especially those which are strongly acidic, tend to have some deteriorating effect on the active ingredients.

One method of applying these pesticides is in the form of a water suspension. However, to obtain a pesticidally active aqueous suspension, a surface-active agent is employed in sufficient amount to disperse and suspend the pesticidal agent. Examples of such surface-active agents which can be employed in forming dispersions include salts of the alkyl and alkaryl sulfonates, such as Du Pont MP-189 and Nacconol-NR, a sodium salt; alkyl sulfates, such as Dreft; alkylamide sulfonates, including fatty methyl laurides, such as Igepon-T; the alkaryl polyether alcohols, such as Triton X-100; the fatty acid esters of polyhydric alcohols, such as Span; the ethylene oxide addition products of such esters, as, for example, Tween, a hexitol product; and the addition products of long-chain mercaptans and ethylene oxide, such as Sharples' Non-Ionic-218. Still other surface-active agents can be employed, the above merely showing a representative list of the more common materials.

The pesticidal activity of the 1-(aminoaryl)triazenes with respect to representative species from the five orders of insects having the largest number of species of economic importance was demonstrated as follows: the 1-(aminoaryl)triazenes were formulated as water emulsions by dissolving the triazene in a suitable solvent containing Triton X-100 as the emulsifier. The 1-(aminoaryl)triazene was dissolved in the solvent-emulsifier and then water was added slowly as the mixture was agitated. A representative solution of a solvent plus Triton X-100 was prepared in a proportion of 92.5 percent solvent and 7.5 percent Triton X-100. The solvents employed in preparing the solutions were acetone and dimethyl formamide, although ethyl alcohol, methyl alcohol, benzene, methylcyclohexane, and the like could also be employed.

In carrying out the tests, 90 mg. of the candidate 1-(aminoaryl)triazenes were weighed out and formulated by adding 3 ml. of the proper solvent-emulsifier stock solution to the chemical and dissolving it. Sometimes it was necessary to warm the solution. Deionized water, to give a total volume of 90 ml., was then added slowly while the mixture was agitated. In some cases, it was necessary to put the emulsion through a tissue grinder in order to grind up the chemical which may have settled out when water was added. Thus, 90 mg. of chemical, 3 ml. of solvent Triton X-100, plus deionized water, to make 90 ml. gave a final emulsion containing 0.1 percent of a 1-(aminoaryl)triazene, 0.25 percent Triton X-100, and 3.08 percent of the solvent. Lesser volumes of the 1000 p.p.m. solution can be prepared as follows:

| Amount Chemical, mg. | Solvent/Triton X-100 | Total Volume, ml. |
|---|---|---|
| 45 | 1.5 | 45 |
| 36 | 1.2 | 36 |
| 24 | 0.8 | 24 |
| 12 | 0.4 | 12 |

For lesser dilutions, for example, 12 ml. of the 1000 p.p.m. solution can be made up. Then 10 ml. can be used to spray 2 replicates at 1000 p.p.m., and the balance can be diluted to 20 ml. to make a solution containing 100 p.p.m.

The formulations thus prepared were tested on the following insects: (1) Third instar larvae of *Epilachna varivestis Mulsant,* order Coleoptera, family Coccinellidae (Mexican bean beetle); (2) third instar larvae of *Prodenis eridania* Cramer, order Lepidoptera, family Phalsenidae (southern armyworm); (3) nymphs and adults of *Aphis gossypii* Glover, order Homoptera, family Aphididae (melon aphid); (4) 7- to 21-day old adults of *Oncopeltus fasciatus* (Dall.), order Hemiptera, family Lygaeidae (milkweed bug); (5) 4-day old adults of *Musca domestica* (Linné), order Diptera, family Muscidae (housefly); and (6) 3- and 4-month old nymphs of *Blatta orientalis* Linné, order Orthoptera, family Blattidae (Oriental cockroach).

The test procedures were as follows:

MEXICAN BEAN BEETLE

In this test the 1-(aminoaryl)triazene acted as a stomach poison in killing the test organism. The procedure employed follows.

One 4- to 6-day old Bountiful green bean primary leaf was used for each replicate. Two replicates were run per compound. The bean leaves were cut from the plants just before use. They were sprayed by placing them on a clean screen in a cage holder of a spray tower and sliding it into position at the base of a glass spray column. Two leaves were sprayed at a time with 5 ml. of the test formulation containing the test compound. Half of the formulation was sprayed on the top side of the leaves, and the remaining half on the bottom side. The formulation was sprayed vertically down through the glass spray column, using a De Vilbiss Special Atomizer No. 5004, with a No. 631 cut-off, constructed by the De Vilbiss Company, Toledo, Ohio. The nozzle of the atomizer was about 34 inches above the leaves and was supplied with 10 p.s.i.g. air pressure. After spraying, the leaves were placed separately in open 100 x 20 mm. plastic petri dishes, and turned once to aid drying. When all spraying had been completed and the formulations had dried, they were taken to an insect holding room where 5 bean beetle larvae were added to each dish. The petri dishes were covered, and, after 48 hours, a mortality count was made and the amount of feeding noted.

SOUTHERN ARMYWORM

The 1-(aminoaryl)triazene acted as a stomach poison in killing the test organism. The procedure was the same as used with the Mexican bean beetle above.

MELON APHID

The 1-(aminoaryl)triazene acted as a contact poison in killing the test organism. The test procedure follows.

About 24 hours before the aphids were to be sprayed, two primary leaves per replicate were cut from Bountiful green beans (grown on vermiculite for 12 days) and placed in test tubes filled with water. Two replicates were set up for each test formulation by infesting the beans with aphids from a stock colony grown on Hubbard squash. The plants were sprayed to wetting with formulations containing the test compound. This was done about 24 hours after the beans had been infested with aphids. The aphids and plants were sprayed directly using the De Vilbiss atomizer held about 12–15 inches from the plant at 10 p.s.i.g. air pressure. The mortality was estimated after 24 hours by observing the aphids under a 10-power dissecting microscope.

The 1-(aminoaryl)triazenes also acted as systemic poisons in killing pests. The test procedure in killing melon aphid test organisms systematically follows.

Five-ounce Dixie cups were filled half full with insulation grade vermiculite (No. 1). Three Straight-8 cucumber seeds were planted per cup. When the plants had emerged 6 days after planting, 20 ml. of a formulation containing the test compound was poured into each cup. One cup was tested per compound. The cucumbers were infested with aphids 24 hours after the formulations had been added to the cups. This was done by placing leaves from the stock colony on the cucumber plants in the cups and allowing the aphids to become re-established. Filter papers were placed over the vermiculite in the cups so that dead aphids could be seen. The mortality was estimated 4 days later by observing the aphids under a 10-power dissecting microscope.

MILKWEED BUG

This test organism was killed using the 1-(aminoaryl)-triazene as a contact poison.

Eight adult bugs were placed in stainless steel test cages, each of which was 5 inches in diameter and 1¾ inches deep with a stainless steel screen bottom and screened removable lid. The small hole on the side of the cage, for the feeding and watering wick, was stoppered to prevent the escape of the insects. Two replicates (8 males and 8 females), or a total of 16 adult bugs, were tested per compound. The bugs were sprayed by placing a cage in a test cage holder at the bottom of a spray tower and sliding it into position at the base of a glass spray column. Each cage was sprayed with 5 ml. of the test formulation containing the test compound. The material was sprayed downward through the glass column using a De Vilbiss atomizer supplied with 10 p.s.i.g. air pressure. The nozzle was 33 inches from the top of the cage. After spraying, the cages were placed in the holding rack, returned to the insect holding room, and allowed to dry. The bugs were fed and watered by inserting a dental cotton roll in the hole on the side of the cage. The cage was placed so that the cotton hung down into a pan containing 5 percent sugar solution in water. Mortality counts were made 48 hours after spraying.

HOUSEFLY

The 1-(aminoaryl)triazene was employed as a contact and knockdown poison. The procedure employed follows.

Rearing cages of four-day old adult houseflies were placed in a cold room and held at 35°–40° F. for about one hour to chill, so that the flies could be transferred to each test cage using a small scoop. Two replicates were run on each test formulation. Holes on the sides of the test cages were stoppered to prevent the escape of the flies. Test cages were the same as described in the milkweed bug test. The caged flies were left on the holding rack for one to two hours at 70°–80° F. before spraying. Flies were sprayed in the screened test cages in the same manner as described for the milkweed bug. Each cage of flies was sprayed with 5 ml. of the test formulation containing the test compound. They were then fed in the same manner as the milkwood bugs. Knockdown counts were made two hours after spraying, and mortality counts 24 hours after spraying.

The 1-(aminoaryl)triazene also was tested upon the housefly as a stomach poison and repellent.

Houseflies in rearing cages were placed in a cold room for about one hour, and then transferred 9 cm. covered petri dishes—10 flies per dish. Two replicates were run on each compound. The flies were held in the chill room until it was time to add treated sugar cubes to the petri dishes. Small sugar cubes (12 mm.) were treated with 0.2 ml. of a formulation containing the test compound in a solvent-water emulsion. After all the cubes had been treated, the petri dishes containing the flies were removed from the cold room. The treated cubes were added to the appropriate dishes. Observations were made every 30 minutes until four observations had been made. The amount of repellency was compared with an untreated control. Stomach poison mortality counts were made 24 hours after treatment.

ORIENTAL COCKROACH

A rearing pan of late instar (3 to 4 months old) roaches was placed in a cold room for about one hour so that the insects could be transferred to test cages with ease. Eight nymphs were placed in each test cage, and two replicates were prepared for each compound being tested. Holes on the sides of the cages were stoppered to prevent escape of the roaches. The caged roaches were held on the rack at 70°–80° F. for at least one hour before spraying. Roaches were sprayed in the test cages in the same manner as the milkwood bugs using 5 ml. of a formulation containing the test compound. After spraying, the test cages were returned to the insect holding room and the roaches were not fed or watered. Mortality counts were made after 72 hours.

Table I summarizes the results obtained with representative pesticidal compositions containing a 1-(aminoaryl) triazene as an active ingredient. In each case the triazene compound, concentrations thereof, solvent, and chemical action as indicated.

The abbreviations employed in this and all other tables appearing herein have the following meaning:

| | |
|---|---|
| - - | Indicates not tested. |
| p.p.m. | Parts per million. |
| MBB | Mexican bean beetle. |
| SAW | Southern armyworm. |
| M. aphid | Melon aphid. |
| Mite | Two-spotted spider mite. |
| Or | Oriental cockroach. |
| MWB | Milkweed bug. |
| cn | Contact poison. |
| sy | Systemic poison. |
| ov | Ovicidal poison. |
| kd | Knockdown poison. |
| st | Stomach poison. |
| rp | Repellent. |

The same rating system was used for all insects. The rating code is as follows.

| Rating: | Percent mortality |
|---|---|
| 0 | 0–10 |
| 1 | 11–20 |
| 2 | 21–30 |
| 3 | 31–40 |
| 4 | 41–50 |
| 5 | 51–60 |
| 6 | 61–70 |
| 7 | 71–80 |
| 8 | 81–90 |
| 9 | 91–100 |

Table I

| Compound | P.p.m. | Solvent | MBB | SAW | M. Aphid cn | M. Aphid sy | MWB | Housefly cn | Housefly kd | Housefly st | Housefly rp | OR |
|---|---|---|---|---|---|---|---|---|---|---|---|---|
| 1-(p-dimethylaminophenyl)-3,3-dimethyltriazene. | 3,500 | Acetone | 9 | 9 | 9 | | 9 | 9 | | | | 9 |
| | 2,500 | | | | | | | | | | | 9 |
| | 1,000 | | 4 | 9 | 9 | | 9 | 9 | 5 | 1 | 9 | 0 |
| | 100 | | 0 | 0 | 6 | 7 | 2 | 0 | 1 | 0 | 8 | 9 |
| | 10 | | 0 | 0 | 1 | | 0 | 0 | 0 | 0 | 9 | |
| 1-(p-diethylaminophenyl)-3,3-dimethyltriazene. | 2,500 | Acetone | | | | | | | | | | 9 |
| | 1,000 | | 0 | 1 | 9 | 8 | 9 | 9 | 9 | 5 | 8 | 9 |
| | 100 | | | | 2 | | 0 | | | | | 0 |
| | 10 | | | | 0 | | | | | | | |
| 1-(p-dimethylaminophenyl)-3-methyl-3-benzyltriazene. | 5,000 | Dimethyl formamide. | | | | | | | | | | 9 |
| | 3,500 | | 9 | 7 | 9 | | 9 | 9 | | | | 2 |
| | 2,500 | | | | | | | | | | | 0 |
| | 1,000 | | 3 | 2 | 9 | | 9 | 9 | 9 | 3 | 9 | 0 |
| | 500 | | 1 | | 2 | | 3 | 9 | | | 9 | 0 |
| | 100 | | 0 | 0 | 6 | 6 | 0 | 0 | 0 | 0 | 8 | 0 |
| | 10 | | 0 | 0 | 2 | | 0 | 0 | 0 | 0 | 7 | |
| 1-(2-methyl-4-dimethylaminophenyl)3,3-dimethyltriazene. | 10,500 | Acetone | | | | | | | | | | 9 |
| | 5,000 | | | | | | | | | | | |
| | 3,500 | | 9 | 9 | 9 | | 9 | 9 | | | | 9 |
| | 2,500 | | | | | | | | | | | 5 |
| | 1,000 | | 1 | 0 | 2 | | 0 | 9 | | 9 | kd | 0 |
| | 500 | | 0 | 0 | 1 | | 0 | 9 | | | | 0 |
| | 100 | | 0 | 0 | 0 | 0 | 0 | 0 | | | | |
| 1-(p-dimethylaminophenyl)-3,3-di-n-butyltriazene. | 10,500 | Acetone | | | | | | | | | | 9 |
| | 3,500 | | 9 | 9 | 9 | | 9 | 9 | | | | 0 |
| | 2,500 | | | | | | | | | | | |
| | 1,000 | | 7 | 9 | 9 | | 9 | 9 | 7 | 6 | 9 | 0 |
| | 500 | | | | | | | 8 | | 2 | 8 | |
| | 100 | | 0 | 0 | 9 | 9 | 0 | 0 | 2 | 0 | 8 | 0 |
| | 10 | | 0 | 0 | 6 | | 0 | 0 | 0 | 0 | 9 | |
| 1-(p-dimethylaminophenyl)-3,3-diethyltriazene. | 10,500 | Acetone | | | | | | | | | | 9 |
| | 3,500 | | 9 | 0 | 9 | | 9 | 9 | | | | 3 |
| | 2,500 | | | | | | | | | | | 5 |
| | 1,000 | | 0 | | 2 | | 0 | 9 | | 4 | 6 | |
| | 500 | | 0 | | 0 | | 0 | 8 | | | | 0 |
| | 100 | | 0 | | 0 | 0 | 0 | 0 | | | | 0 |
| 1-(p-Di-n-butylaminophenyl)-3,3-dimethyltriazene. | 10,500 | Acetone | | | | | | | | | | 2 |
| | 3,500 | | 7 | 1 | 9 | | 9 | 9 | | | | |
| | 1,000 | | | | 9 | | 3 | 9 | | 5 | kd | |
| | 500 | | | | 4 | | 0 | 9 | | | | |
| | 100 | | | | 1 | 0 | 0 | 0 | | | | |
| 1-(3-Methyl-4-dimethylaminophenyl)-3,3-dimethyltriazene. | 5,000 | Acetone | | | | | | | | | | 9 |
| | 2,500 | | | | | | | | | | | 7 |
| | 1,000 | | 6 | 7 | 9 | | 9 | 9 | | 9 | 9 | 0 |
| | 500 | | 1 | 0 | 9 | | 9 | 9 | | 7 | 9 | |
| | 100 | | 0 | 0 | 3 | 0 | 0 | 0 | | | 9 | |
| | 10 | | | | | | | | | | | |
| 1-(4-dimethylaminophenyl)-3,3-diallytriazene. | 5,000 | Acetone | | | | | | | | | | 9 |
| | 2,500 | | | | | | | | | | | 5 |
| | 1,000 | | 3 | 1 | 9 | 5 | 6 | 9 | 9 | 2 | 8 | 0 |
| | 100 | | 0 | 0 | 3 | 1 | 0 | 0 | 0 | 0 | 8 | 0 |
| | 10 | | | | | | | | | | 8 | |

The pesticidal compositions of this invention, in addition to being applicable to insects, exhibit excellent miticidal activity. This activity was demonstrated by employing as a test organism the two-spotted spider mite (nymphs and adults of Tetranychus telarius (Linné), order Acarina, family Tetranychidae). The test procedure is as follows.

About 20 hours before spraying, two primary leaves per replicate were cut from Bountiful green beans grown on vermiculite for 12 days. The cotyledons were removed and the leaves were placed in test tubes full of water. The plants were then infested with mites from the stock mite culture pans which had been infested seven days earlier. Each leaf was infested with about 50–75 mites by placing an infested leaf, or part of a leaf, on the uninfested bean plant. About 20 hours after infesting, the plants were sprayed to wetting with the test formulation containing the test compound. The mites and plants were sprayed directly using the De Vilbiss atomizer held about 12–15 inches from the plant at 10 p.s.i.g. air pressure. The mortality for the contact tests was estimated 24 hours later by examination under a 10-power dissecting microscope. The same plants were held an additional four days, and counts were made to determine ovicidal action.

Table II summarizes the results obtained with representative pesticidal compositions of this invention. In each case the triazene compound, concentration employed, solvent and chemical action are indicated.

Table II

| Compound | P.p.m. | Solvent | Two-spotted Spider Mite cn | Two-spotted Spider Mite ov |
|---|---|---|---|---|
| 1-(p-dimethylaminophenyl)-3,3-dimethyltriazene. | 3,500 | Acetone | 9 | |
| | 2,500 | | | |
| | 1,000 | | 9 | 5 |
| | 100 | | 5 | 0 |
| | 10 | | 0 | |
| 1-(p-diethylaminophenyl)-3,3-dimethyltriazene. | 2,500 | Acetone | | |
| | 1,000 | | 9 | 8 |
| | 100 | | 0 | 3 |
| | 10 | | 0 | 0 |
| 1-(p-dimethylaminophenyl)-3,3-tetramethylenetriazene. | 3,500 | Acetone | 8 | 0 |
| | 1,000 | | 6 | |
| | 500 | | 5 | |
| | 100 | | 2 | |

Table II—Continued

| Compound | P.p.m. | Solvent | Two-spotted Spider Mite | |
|---|---|---|---|---|
| | | | cn | ov |
| 1-(p-dimethylaminophenyl)-3-methyl-3-benzyltriazene. | 5,000<br>3,500<br>2,500<br>1,000<br>500<br>100<br>10 | Dimethyl form-amide. | ------<br>9<br>------<br>9<br>9<br>6<br>0 | ------<br>9<br>------<br>9<br>4<br>1<br>0 |
| 1-(o-dimethylaminophenyl)-3,3-dimethyltriazene. | 10,500<br>3,500<br>1,000<br>500<br>100 | Acetone | ------<br>4<br>4<br>2<br>0 | ------<br>9<br>4<br>0<br>0 |
| 1-(p-dimethylaminophenyl)-3,3-(3'-oxapentamethylene)triazene. | 5,000<br>2,500<br>1,000<br>100<br>3,500<br>1,000<br>500<br>100 | Acetone | ------<br>------<br>------<br>------<br>9<br>9<br>0<br>------ | ------<br>------<br>------<br>------<br>0<br>0<br>------<br>------ |
| 1-(2-methyl-4-dimethylaminophenyl)-3,3-dimethyltriazene. | 10,500<br>5,000<br>3,500<br>2,500<br>1,000<br>500<br>100 | Acetone | ------<br>------<br>9<br>------<br>3<br>2<br>0 | ------<br>------<br>9<br>------<br>0<br>0<br>0 |
| 1-(p-dimethylaminophenyl)-2,3-di-n-butyltriazene. | 10,500<br>3,500<br>2,500<br>1,000<br>500<br>100<br>10 | Acetone | ------<br>9<br>------<br>9<br>------<br>7<br>0 | ------<br>9<br>------<br>6<br>------<br>1<br>0 |
| 1-(p-di-n-butylaminophenyl)-3,3-dimethyltriazene. | 10,500<br>3,500<br>1,000<br>500<br>100 | Acetone | ------<br>9<br>9<br>4<br>0 | ------<br>9<br>0<br>0<br>0 |
| 1-(p-dimethylaminophenyl)-3,3-diethyltriazene. | 10,500<br>3,500<br>2,500<br>1,000<br>500<br>100<br>10 | Acetone | ------<br>9<br>------<br>1<br>0<br>0<br>------ | ------<br>9<br>------<br>0<br>0<br>0<br>------ |
| 1-(3-methyl-4-dimethylaminophenyl)-3,3-dimethyltriazene. | 5,000<br>2,500<br>1,000<br>500<br>100<br>10 | Acetone | ------<br>------<br>9<br>9<br>9<br>0 | ------<br>------<br>0<br>0<br>0<br>------ |
| 1-(4-dimethylaminophenyl)-3,3-diallyltriazene. | 5,000<br>2,500<br>1,000<br>100<br>10 | Acetone | ------<br>------<br>9<br>3<br>------ | ------<br>------<br>7<br>0<br>------ |
| 1-(2-chloro-4-dimethylaminophenyl),3-dimethyltriazene. | 2,500<br>1,000<br>100 | Acetone | ------<br>9<br>1 | ------<br>0<br>0 |

It can thus be seen that the pesticidal compositions of this invention are excellent broad-spectrum insecticides as well as extremely effective miticides.

Pesticidally active 1-(aminoaryl)triazene ingredients of the pesticidal compositions of this invention were generally prepared by coupling a diazonium salt with a primary or secondary amine in basic medium. The diazonium salt can easily be prepared by reacting a salt of an aromatic amine with nitrous acid in a strongly acid solution at about 0° C. (The nitrous acid usually is produced in situ by the addition of sodium nitrite to the suspension of amine salt in excess mineral acid.)

Another method sometimes employed in preparing the 1-(aminoaryl)triazene was the reaction of nitrous acid with a dialkylaniline, having an unsubstituted para position. The reaction was run at about 0° C. in strongly acid medium to produce the p-nitroso derivative. (Here again the nitrous acid can be generated in situ, as above.) Reduction of the p-nitrosodialkylaniline yielded the p-dialkylaminoaniline which, upon conversion to the amine salt, diazotization and coupling with a primary or secondary amine produced the desired 1-(aminoaryl)triazene.

The following examples more fully demonstrate the preparation of representative triazenes utilized in this invention.

EXAMPLE I

About 55.8 g. of p-di-n-butylaminoaniline hydrochloride were dissolved in 250 ml. of water. Five ml. of 12 N hydrochloric acid were added, and the acidified solution was chilled to about 0° C. A solution containing 15.2 g. of sodium nitrite dissolved in 50 ml. of water was added to the stirred solution of the amine hydrochloride in dropwise fashion over a period of about 30 minutes, thus forming p-di-n-butylaminophenyldiazonium chloride. A solution of 110 g. of 25 percent aqueous dimethylamine was then added also in dropwise fashion. After the addition had been completed, the reaction mixture was allowed to warm up to ambient temperature. The reaction mixture was alkaline at this point. The reaction mixture was extracted with 300 ml. portions of ether. The ether extracts were combined, were washed once with 100 ml. of water, and were dried. The ether was removed by evaporation in vacuo, and the residue comprising 1-p-(di-n-butylaminophenyl)-3,3-dimethyltriazene formed in the above reaction was purified by distillation. The compound distilled in the range 178–179° C. at a pressure of about 0.6 mm. of mercury; $n_D^{25}=1.590$.

*Analysis.*—Calc.: N, 20.27. Found: N, 19.97.

EXAMPLE II 100 g. of di-n-butylaniline were dissolved in 100 ml. of 12 N hydrochloric acid. 100 ml. of water were added, and the resulting solution was cooled to about 0° C. A solution containing 40 g. of sodium nitrite and 100 ml. of water was added dropwise to the stirred di-n-butylaniline hydrochloride solution. After the addition had been completed, the reaction mixture was stirred for an additional hour and then was extracted, while still cold, with two 500 ml. portions of ether. The ether extracts were discarded. The aqueous layer was made alkaline by the slow addition of 14 N ammonium hydroxide while maintaining the temperature below about 5° C. The alkaline solution was extracted with three 500 ml. portions of ether. The ether extracts were combined, were washed with one 500 ml. portion of water, and were dried. The ether was removed by evaporation in vacuo, leaving as a residue p-nitroso - N,N - di-n-butylaniline formed in the reaction.

p-Nitroso-N,N-di-n-butylaniline thus prepared was dissolved in about 100 ml. of anhydrous ethanol. 0.1 g. of platinum oxide was added, and the mixture was hydrogenated at a pressure of about 50 pounds on a low-pressure hydrogenation apparatus. After the theoretical quantity of hydrogen had been absorbed, the reaction mixture was removed from the hydrogenation apparatus, and the catalyst was separated by filtration. The filtrate containing p-di-n-butylaminoaniline was acidified with 250 ml. of 12 N hydrochloric acid. The acidified solution was decolorized and was then evaporated to dryness in vacuo, leaving a purple-colored residue. The residue was dissolved in boiling ethanol containing about 10 percent water. Ether was added to the hot solution to the point of incipient precipitation. Cooling of the crystallization mixture yielded light-tan crystals of p-di-n-butylaminoaniline hydrochloride, melting at about 207–208° C. This material was then diazotized and coupled with dimethylamine according to the procedure of Example I to produce 1-(p-di-n-butylaminophenyl) - 3,3 - dimethyltriazene.

EXAMPLE III

The procedure of Example I was employed with the exception that 78.8 parts of p-dimethylaminoaniline hydrochloride were employed in place of 55.8 grams of p-di-n-butylaminoaniline hydrochloride and 46.8 parts of diethylamine were employed in place of 110 grams of 25 percent diethylamine to produce 1-(p-dimethylaminophenyl)-3,3-diethyltriazene.

Boiling point: 147–149° C. at 0.4 mm. of mercury; $n_D^{25} = 1.622$.

*Analysis.*—calc.: N, 25.43. Found: N, 25.67.

Further illustrative of the 1-(aminoaryl)triazenes which comprise the pesticidally active ingredient of the composition of this invention are 1-(p-pyrrolidinophenyl)-3,3-dimethyltriazene;
1-(3-chloro-4-dimethylaminophenyl)-3,3-dimethyltriazene;
1-(3-trifluoromethyl-4-dimethylaminophenyl)-3,3-dimethyltriazene;
1-(2-methoxy-4-dimethylaminophenyl)-3,3-dimethyltriazene;
1-(p-dimethylaminophenyl)-3-methyl-3-(p-methylbenzyl)triazene;
1-(p-dimethylaminophenyl)-3,3-(tetramethylene)triazine;
1-(o-diethylaminophenyl)-3,3-(pentamethylene)triazene;
1-(m-dipropylaminophenyl)-3,3-(3'-oxapentamethylene)triazene;
1-(p-dibutylaminophenyl)-3,3-(3'-thiapentamethylene)triazene;
1-(p-dimethylaminophenyl)-3,3-(3'-azapentamethylene)triazene (and the derivatives thereof having lower alkyl substituted on the aza nitrogen);

1-(p-butylaminophenyl)-3,3-(hexamethylene)triazene;
1-(p-dimethylaminophenyl)-3,3-(dimethylene)triazene;
1-(o-dimethylaminophenyl)-3,3-(trimethylene)triazene; and the like.

We claim:

1. A pesticidal composition which comprises 1-(p-dimethylaminophenyl)-3,3-di-n-butyltriazene, together with an inert pesticidal adjuvant as a carrier therefor.

2. A composition comprising an inert pesticide adjuvant and a pesticidally effective concentration of a 1-(aminoaryl)triazene as an active ingredient thereof, said triazene having the formula:

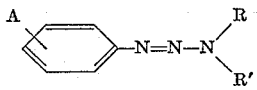

wherein A is di(lower)alkylamino in which the alkyl groups contain from one to four carbon atoms, and R and R' are lower alkyl containing from one to four carbon atoms.

3. The method of controlling pests which comprises treating said pests and their loci with a composition containing a pesticidally effective concentration of a compound of the formula:

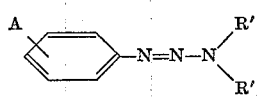

wherein A is di(lower)alkylamino in which the alkyl groups contain from one to four carbon atoms, and R and R' are lower alkyl containing from one to four carbon atoms.

4. The method of claim 3 wherein the compound is 1-(p-dimethylaminophenyl)-3,3-di-n-butyltriazene.

References Cited by the Examiner
UNITED STATES PATENTS
1,882,562  10/32  Glietenberg et al. _____ 167—30

JULIAN S. LEVITT, *Primary Examiner.*
FRANK CACCIAPAGLIA, Jr., *Examiner.*